United States Patent [19]

Norris et al.

[11] 4,133,215
[45] Jan. 9, 1979

[54] LINEAR-ROTARY CONVERTER

[75] Inventors: Kenneth W. Norris, Worthing; Alan D. Bunyard, Patcham; Derek N. Marchant, Hassocks, all of England

[73] Assignee: Worcester Controls AG, Zug, Switzerland

[21] Appl. No.: 822,578

[22] Filed: Aug. 8, 1977

[30] Foreign Application Priority Data

Aug. 11, 1976 [GB] United Kingdom ............... 33374/76
May 31, 1977 [GB] United Kingdom ............... 22932/77

[51] Int. Cl.² .............................................. G01B 5/30
[52] U.S. Cl. .......................................... 74/89; 92/31;
74/520; 74/106; 92/140; 251/58
[58] Field of Search .................. 92/31, 140; 74/47, 57,
74/520, 521, 20, 106, 89, 89.1, 89.2; 64/19, 10;
251/58

[56] References Cited

U.S. PATENT DOCUMENTS

| 582,244 | 5/1897 | Tuckfeild | 74/57 |
| 849,506 | 4/1907 | Shadall | 74/57 |
| 1,122,085 | 12/1944 | Dudgeon | 74/57 |
| 3,513,754 | 5/1970 | John | 92/31 |

FOREIGN PATENT DOCUMENTS 529950 8/1957 Belgium ..................... 64/19

652187 10/1937 Fed. Rep. of Germany ............. 92/31

*Primary Examiner*—Benjamin W. Wyche
*Assistant Examiner*—Gerald Anderson
*Attorney, Agent, or Firm*—Pollock, VandeSande and Priddy

[57] ABSTRACT

A device for interconverting linear and rotatory motions, and particularly a pressure fluid operated actuator for rotary plug valves and the like. A piston axially slideable and rotatable in a cylinder is supported by first and second sets of connecting elements which are spaced from and inclined to the axis of the cylinder. Each element of one set is pivotally connected at one end with a fixed member and at the other with the piston. Each element of the other set is pivotally connected at one end with the piston and at the other with a rotary output element, for example, a shaft. Axial movement of the piston is translated into rotatory movement of the output element by pivotal action of the connecting elements. The connecting elements of the first and second sets extend from the fixed member to the piston and from the piston to the output element in opposite circumferential directions. This configuration enables the torque characteristic to be tailored readily to suit particular applications by appropriate selection of the relative dimensions of the components of the device.

21 Claims, 7 Drawing Figures

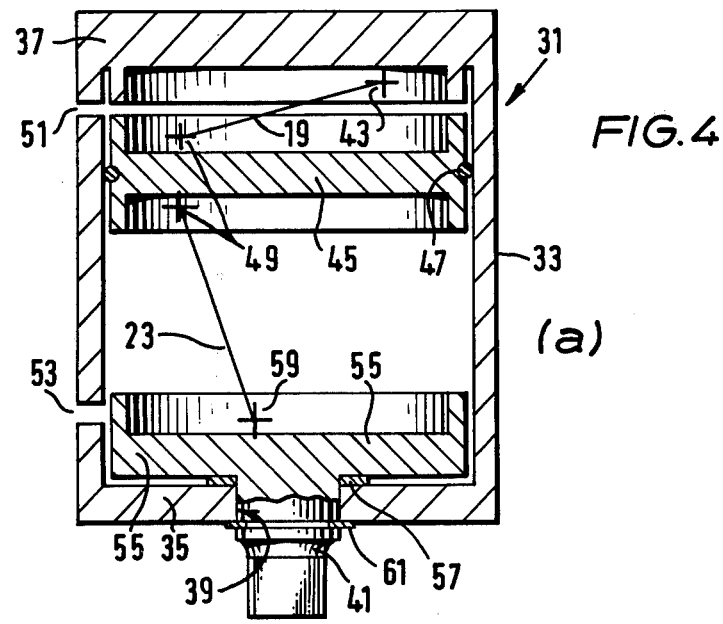
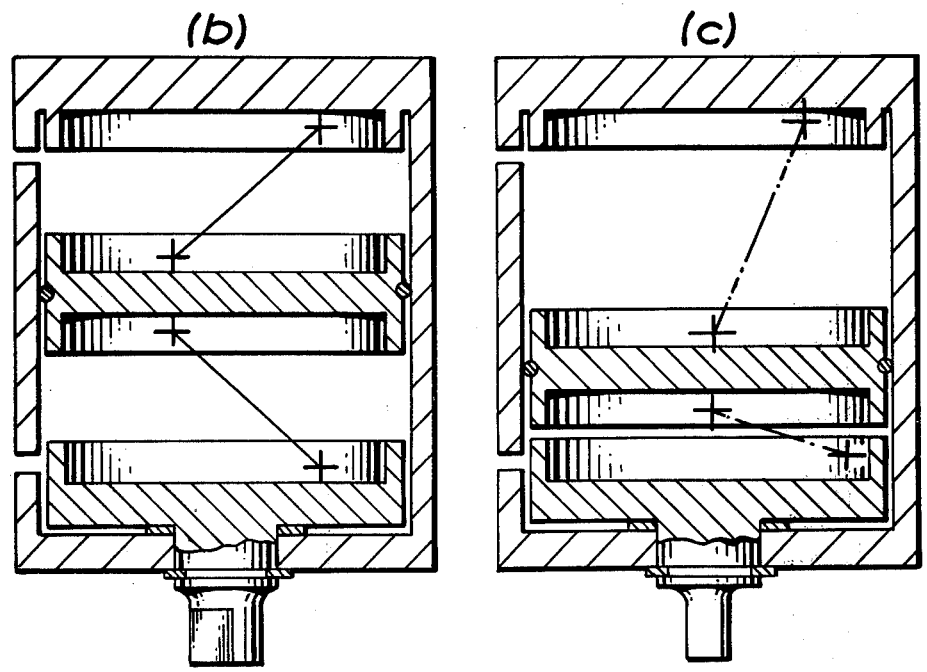
FIG.4

LINEAR-ROTARY CONVERTER

BACKGROUND OF THE INVENTION

This invention relates to devices for converting linear motion into rotatory motion and vice versa, and is particularly, although not exclusively, applicable to pressure fluid operated devices, for example, pneumatic and hydraulic actuators, air motors, and pumps.

One type of device to which the invention is particularly applicable is a pneumatic or hydraulic actuator for a quarter-turn valve, for example, a plug valve. Such an actuator is required to convert the generally linear force or motion produced by a piston in a pneumatic or hydraulic cylinder into a torque or rotatory motion applied to the operating shaft of the valve. Commonly, a 90 degree rotation of the operating shaft is required to open and close the valve. Existing devices for converting the linear motion of the piston into the required rotatory motion are somewhat cumbersome and expensive, a common form of such device using a rack-and-pinion mechanism.

DESCRIPTION OF THE PRIOR ART

Forsman U.S. Pat. No. 3,156,161 describes a pressure fluid operated rotary actuator for plug valves. The device comprises a piston movable in a cylinder under the action of applied fluid pressure, a first connecting element universally pivotally connected at its ends with a fixed member and the piston, and a second connecting element universally pivotally connected at its ends with the piston and a radially extending arm fast with a rotary output shaft which is coaxial with the cylinder.

A severe practical disadvantage of the arrangement is that the torque characteristic of the device (that is, the torque output of the device for given axial thrust on the piston) varies widely over the operating range of the device; the torque is very low when the piston is in a position in which the connecting elements extend nearly parallel with the axis of the cylinder, and rises steeply as the piston approaches the position in which the connecting elements lie in a transverse plane. Such a torque characteristic is frequently unsuitable for actuators for plug valves and the like which should have a substantially flat torque characteristic or one which rises at each of the operating range.

SUMMARY OF THE INVENTION

It is an object of the present invention to provide a device for interconverting linear and rotatory motion, of which the torque characteristic can be tailored to suit a required application.

It is a more particular object of the present invention to provide a rotary actuator for a quarter-turn valve, of which the torque characteristic is substantially flat or rises at both ends.

From one aspect the present invention provides a device for converting linear motion into rotatory motion and/or vice versa, said device comprising first, second and third elements mounted to permit linear motion of said second element relative to said first and third elements and rotatory motion of said second and third elements relative to each other and to said first element about a common axis parallel with the direction of said linear motion, a first plurality of elongate connecting elements each having a first length and extending between and universally pivoted at its first and second ends with said first and second elements respectively and a second plurality of elongate connecting elements each having a second length and extending between and universally pivoted at its first and second ends with said second and third elements respectively, wherein said first and second ends of said each connecting element of said first plurality are spaced from said axis at respective first and second radii, said first and second ends of said each connecting element of said second plurality are spaced from said axis at respective third and fourth radii, the tangential components of the directions in which the connecting elements of said first plurality extend away from said first element towards said second element are directed in one angular sense about said axis, the tangential components of the directions in which the connecting elements of said second plurality extend away from said second element towards said third element are directed in the other angular sense about said axis, and said linear and rotatory motions are interconvertable through pivotal action of said connecting elements.

In its preferred form, the invention provides a rotary actuator comprising a device as defined above wherein said first element is fixed, said third element is retained in a fixed axial position relative to said first element and said second element is arranged to be driven axially relative to said first and third elements whereby to drive said third element rotatably relative to said first element. The relative dimensions of said first, second, third and fourth radii, said first and second lengths and the axial separation of said first and third elements are such that the torque developed between said first and third elements in response to a given axial force applied to said second element is substantially constant or passes through a minimum as said second element is moved axially between said first and third elements.

Optionally, said first, second, third and fourth radii, or any of them, can be equal.

Said linear and rotatory motions are interconvertable through pivotal action of said connecting elements in all cases except that in which the geometric mean of said first and second radii is equal to the geometric mean of said third and fourth radii and the axial separation of said first and second ends of said each of the connecting elements of said first plurality is equal in magnitude and opposite in sense to the axial separation of said first and second ends of said each of the connecting elements of said second plurality.

From a second aspect, the present invention provides a rotary actuator for a rotary device actuable in response to an applied torque which is within a given operating range, said actuator comprising an output shaft, a linearly movable element mounted for axial displacement relative to said shaft, connecting means including one or more eccentrically disposed connecting elements extending between and pivotally connected at its or their ends with said linearly movable element and output shaft respectively to convert axial motion of said linearly movable element into rotatory motion of said shaft, a thrust bearing surface for engagement by a radial surface of said shaft to provide positive axial location thereof, and bias means arranged so that, at least during operation of the actuator to supply a torque within said operating range, said shaft is resiliently biased, in the axial direction tending to engage said radial surface with said bearing surface, with a force which is substantially equal to or greater than the axial component of force exerted on said shaft by said connecting means.

In one embodiment, said bias means comprises spring washer means compressed between an annular shoulder formed on said shaft and a fixed annular thrust surface, said spring washer means being stressed to urge said shaft in said axial direction with a force which is at least substantially equal to the maximum axial component of force exerted on said shaft by said connecting means during operation of the actuator to supply a torque within said operating range.

Another, pressure fluid operated, embodiment comprises a cylindrical bore, and said linearly movable element is formed by a piston slideable in said cylindrical bore for axial displacement therein in response to supplied pressure fluid, and said bias means comprises a disc connected with said shaft and sealingly and slidingly engaged around its periphery with said cylindrical bore so that said disc and piston define respective ends of the chamber to which pressure fluid is supplied in use of the actuator to urge said piston in the axial direction opposed in sense to the said axial direction, whereby in use of the actuator, the pressure exerted on said disc by pressure fluid supplied to said chamber urges said shaft in the said axial direction with a force substantially equal to or greater than the axial component of force exerted on said shaft by said connecting means.

DETAILED DESCRIPTION OF THE EMBODIMENTS

Further features and advantages of the invention will appear from the following description of embodiments thereof, described by way of example only with reference to the accompanying drawings wherein:

FIG. 4 is a schematic illustration of a pressure fluid operated actuator in accordance with the invention;

FIG. 1 is a schematic illustration of the principal elements of a device in accordance with the invention. The device comprises first and second cooperating units 11 and 13, referred to herein as 'fundamental' units.

Figure 1:
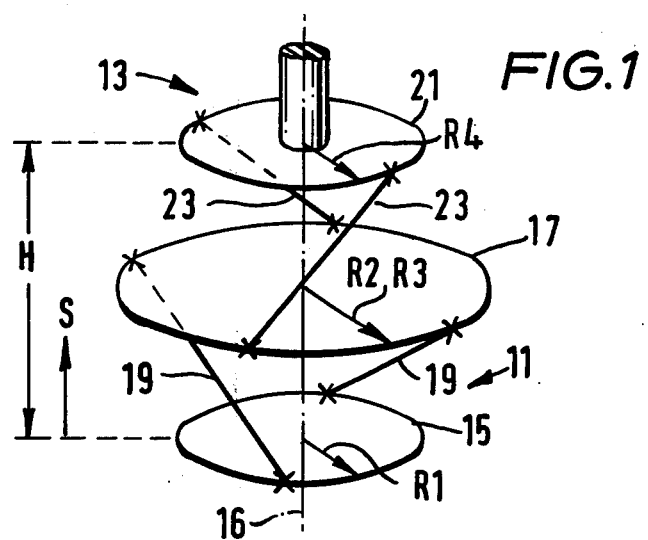
FIG. 1 is a schematic illustration of the principal elements of a device in accordance with the invention.

The first fundamental unit 11 comprises first and second main elements 15, 17 mounted for relative rotatory motion and relative linear motion along the axis 16 of rotation, and a plurality of connecting elements 19 of equal length which are spaced from the axis at equal radial distances and are pivotally engaged at their ends (each represented by a 'x') with the main elements 15, 17. The connecting elements 19 are inclined relative to the axis at equal angles in one helical sense so that tensile and/or compressive stesses developed in the connecting elements on applying a torque to the main elements 15, 17 have axial components tending to relatively move the main elements in the axial direction, and tensile and/or compressive stresses developed in the connecting elements on applying an axial force to the main elements have circumferential components tending to relatively rotate the main elements.

The points of engagement of the connecting elements 19 with one main element must be spaced from the axis at one radius, but they need not lie in the same radial plane. The radius of the points of engagement of the connecting elements with one main element can be different from the radius of the points of engagement with the other.

The connecting elements 19 can be either rigid, in which case they should be universally pivotally engaged at their ends with the main elements; or resiliently flexible, in which case they need not be universally pivotally engaged at their ends with the main elements but if not they would be subject to both torsional and flextural deformation during operation of the unit.

The connecting elements 19 can be either connected at their ends with the main elements, or resiliently urged into engagement with detents formed on those elements (for example, under the action of stresses developed in the connecting elements in the case of a unit with resiliently flexible connecting elements). In the first case, the unit would be double-acting, that is to say, the connecting elements and their end connections would be capable of supporting both compressive and tensile stress so that linear and rotatory power are interconvertable irrespective of the direction of motion of the input power. In the second case, linear and rotatory power are interconvertable only if the direction of the linear or rotatory motion of the power input is such as to tend to compress the connecting elements.

In the case in which the ends of the connecting elements are resiliently urged into engagement with detents formed on the main elements, continuous output motion is possible by forming the detents to provide a ratchet-action. In other cases, the unit would be capable of only limited rotatory and linear motion.

Universal pivotal connections at the ends of the connecting elements may be formed, for example, by ball and socket joints, trunnions, "hook and eye" arrangements and the like.

The second fundamental unit 13 shares the main element 17 with the first unit 11, and further comprises a third main element 21 and a second plurality of connecting elements 23. The second and third main elements 17, 21 are mounted for relative rotatory motion about the axis 16 and relative axial motion along the axis 16. In all respects the above comments relating to the unit 11 apply equally to the unit 13. The dimensions of the various components of the second unit 13 can be the same or different from those of corresponding components of the unit 11.

In the device of FIG. 1, the first main element 15 is fixed and main element 21 is mounted for rotatory motion about the axis 16 but held by means such as thrust bearings (not shown) at a fixed axial distance from the first element 15. Accordingly, linear power applied to the second main element 17 can be converted to output rotatory power in the third element 21, the torque being reacted through the first element 15. However, it should be noted that to obtain an operable device in which all the dimensions of one unit are respectively equal to corresponding dimensions of the other, the points of pivotal engagement of the ends of the connecting elements 19 with main element 15 must be axially spaced from the points of pivotal engagement of the connecting elements 23 with the main element 21.

It is a feature of the device illustrated in FIG. 1 that the connecting elements 19 and 23 of the two units 11 and 13 extend respectively towards and away from the common main element 17 in directions having tangential components directed in opposite senses about the axis 16. Such a configuration is referred to and defined herein as "anticircumfluent".

The transfer function F(S) of each of the fundamental units 11, 13 (i.e. the rate of relative angular displacement with relative axial displacement of the main elements expressed as a function of the axial separation S of the ends of each connecting element) depends upon the geometry of the unit. In cases in which there is no spring return action the transfer function F(S) also represents the theoretical axial thrust for given torque expressed as a function of 8.

Figure 2:
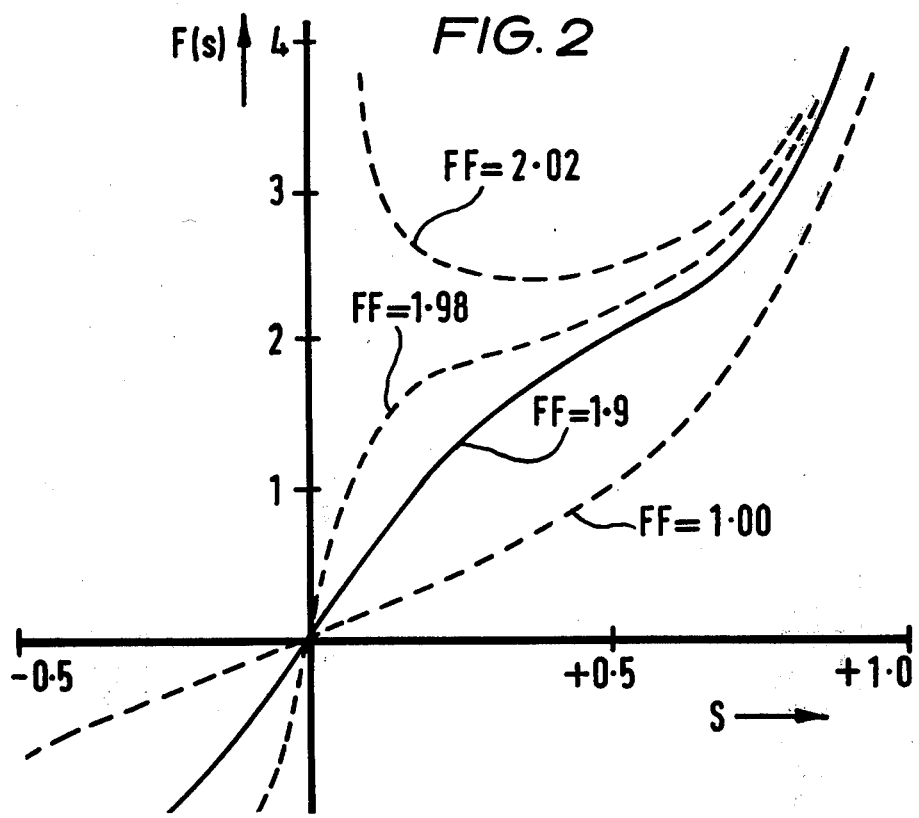
FIG. 2 illustrates the dynamic transfer functions of fundamental units of devices in accordance with the invention.

FIG. 2 illustrates, at 'FF=1.9', the form of the transfer function F(S) for unit 11. The axial separation S of the main elements 15, 17 is measured from the position in which the connecting elements 19 lie in a plane orthogonal to the axis 16, and the unit of length is the length of the connecting elements 19. Thus, when S=1 the connecting elements 19 extend parallel with the axis 16. It will be noted that a toggle action occurs at the positions in which S=0 and S=1, an infinite axial force P being produced by a near zero torque T at the point S=1, and zero axial force P being produced by a near infinite torque T at the point S=0.

The form of the transfer function depends upon the relative values of R1, and R2 and L where R1, R2 are the pitch circle radii of the pivotal connections of the ends of the connecting elements 19 with the respective main elements 15, 17, and L is the length of the connecting elements 19. More specifically, the form of the transfer function depends upon the ratio of L and the geometric mean R of the radii R1 and R2. That ratio, L/R, is referred to herein as the "form factor" (FF) of the unit. The shapes of the function F(S) for FF=1.00, FF=1.98 and FF=2.02 are indicated by broken lines in FIG. 2.

In a double unit device, such as that illustrated in FIG. 1, the output torque is just the sum of the torques developed by the two units, so that the transfer function F(TOT) for the device as a whole is just the sum of the functions F(S) for the respective units. However, since the configuration of the two units is anticircumfluent (as defined above), the function F(S) for one of the units is inverted relative to that of the other when plotted against axial displacement of the common second element 17.

Figure 3:
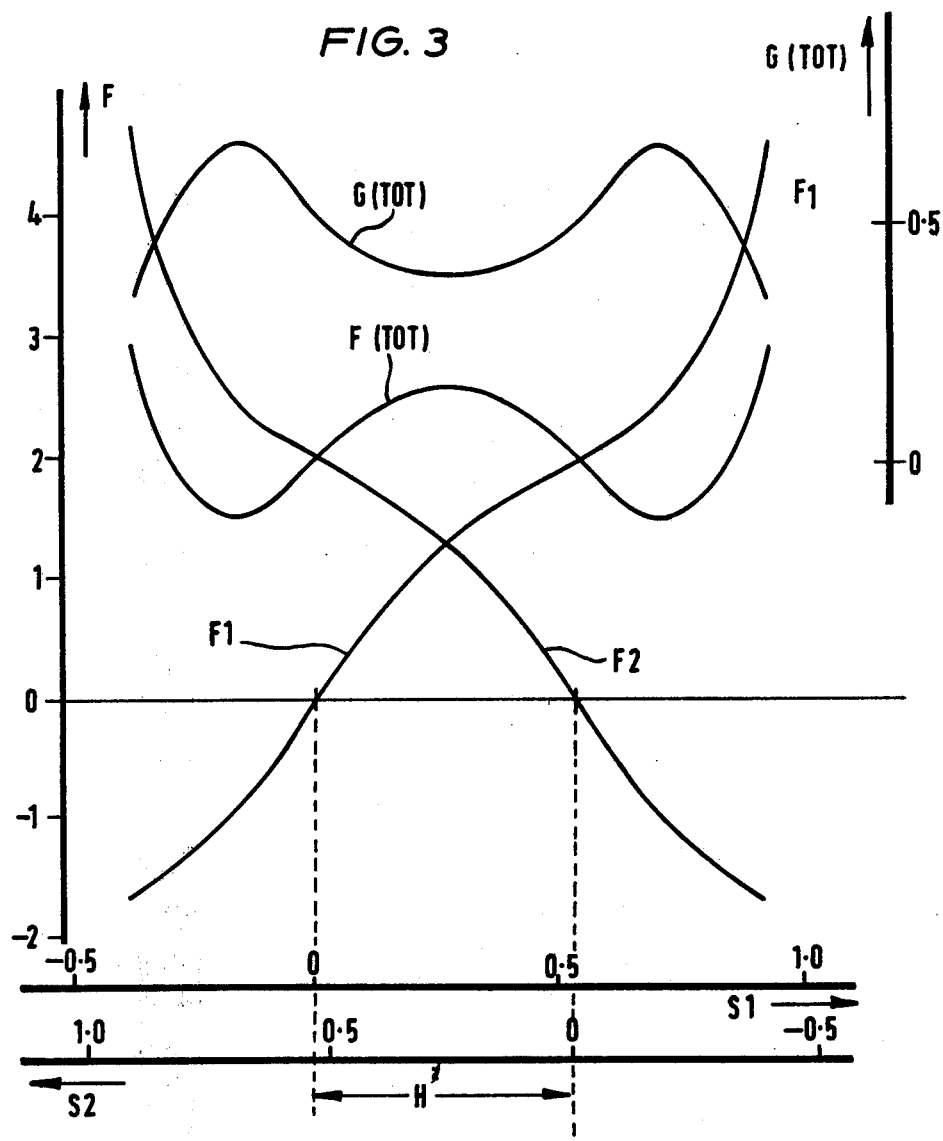
FIG. 3 illustrates dynamic transfer functions relating to the device of FIG. 1.

FIG. 3 shows at F1 and F2 the functions F(S) of the two units 11, 13 of the device of FIG. 1, together with the overall transfer function F(TOT), when R1=R2=R3=R4=H (where H is the axial separation of the main elements 15, 21) and FF1=FF2=1.9 (where FF1, FF2 are the form factors for the respective units). Also of interest, especially for pneumatic and hydraulic applications (described below) is the inverse of F(TOT), referred to herein as the torque characteristic G(TOT). This represents the variation of output torque for given axial thrust, and is also shown in FIG. 3 (plotted against the scale on the right-hand side of the FIGURE).

While in FIG. 1 only two connecting elements are shown in each unit 11, 13, it will be appreciated that more than two elements can be distributed about the axis 16, thereby increasing the loading capabilities of the device. However, if more than two connecting elements are provided, close tolerancing of the dimensions or other steps should be taken to ensure equal loadings on the connecting elements.

In a device such as that illustrated in FIG. 1, separate means for supporting the piston are frequently unnecessary, at least if the unit is always operated within a range such that the directions in which the connecting elements extend have significant axial components. In this case, positive support in both axial and transverse directions is provided by the connecting elements 19 and 23. For this reason, the device is particularly useful in pneumatic and hydraulic applications, such as pumps and actuators, in which the "floating" element 17 forms the piston. However, it will be appreciated that in some circumstances it may be desirable to provide an axially extending central guide member for the floating element 17.

FIG. 4 is a schematic illustration of a pressure fluid operated rotary actuator in accordance with the invention, and shows at (a), (b) and (c) respectively, different operating positions of the actuator. The actuator comprises a cylindrical chamber 31 formed by a cylinder 33 and two cylinder heads 35 and 37 providing sealed end closures for the cylinder 33. Cylinder head 35 is provided with an axial orifice 39 through which passes a shaft 41 which forms an output drive for the device. Cylinder head 37 is provided with a series of retainments 43 (only one shown) on its inside face which are equally spaced around a circle close to the periphery of the cylinder head to provide pivotal attachments for one end of each of a plurality of connecting elements 19 (only one shown).

A piston 45 provided with a seal 47 registered in its periphery for sealing engagement with the bore of the cylinder 33 is axially and rotatably movable in the cylinder 33. Each face of the piston 45 is provided with a series of equally spaced retainments 49 (only one of each shown) close to its periphery for pivotal attachment of the connecting elements 19 to its upper (as seen in the drawing) side and a further plurality of connecting elements 23 (only one shown) to its lower (as seen) side.

The piston 45 is displaceable axially within the cylinder 33 under the action of pressure fluid applied to its upper and lower (as seen in the drawings) face via ports 51 and 53 respectively. During motion, alignment of the piston 45 is maintained by the symmetrical disposition of the connecting elements 19 and 23.

A disc 55 fast with the shaft 41 is mounted for rotational movement only, the shaft 41 being trapped between a thrust washer 57 and a circlip 61. An 'O'-ring (not shown) is provided on the shaft 41 to seal the aperture 39. Spring washer means (not shown) are provided to axially bias the shaft 41 for the reasons discussed in greater detail below. The disc 55 is provided on its inner face with equally spaced retainments 59 (only one shown) providing pivotal attachments for the connecting elements 23.

It will be appreciated that the cylinder head 37, piston 45 and disc 55 correspond functionally to the first, second and third main elements 15, 17, 21 of the schematic illustration of FIG. 1.

The successive drawings (a), (b) and (c) serve to illustrate operation of the device as the piston 45 is moved progressively downwardly (as seen in the drawings) in the cylinder 33 under the action of applied fluid pressure. When fluid pressure is applied to port 51, the piston 45 is forced away from the cylinder head 37 and as it moves accordingly it is also rotated by the pivotal action of the connecting elements 19. At the same time, the downward movement of the piston causes relative rotation between the piston 45 and disc 55 through the pivotal action of connecting elements 23, the inclinations of the two sets of connecting elements 19 and 23 to the axis 16 being in opposite helical directions so that this relative rotational movement is added to the absolute rotational movement of the piston. Thus, rotation of the disc 55 is in the same direction as that of the piston 45, and over the full piston travel (from the position shown in FIG. 4(a) to that shown in FIG. 4(c) is substantially equal to twice the angular rotation of the piston (assuming the connecting elements of one set to be equal in length to those of the other and radially spaced from the axis by the same distance). Angular rotation of the disc 55 can, of course, be reversed by applying pressure fluid to port 53 so as to force the piston towards the cylinder head 37.

It will be appreciated that in the device illustrated in FIG. 4, no axially moving shafts, piston rods or the like project from the cylinder chamber 31, and no gearing or cranking means are required for converting the linear motion of the piston into rotatory motion of the output shaft, and moreover the overall length of the device as a whole need be little greater than the travel of the piston.

Figure 5:
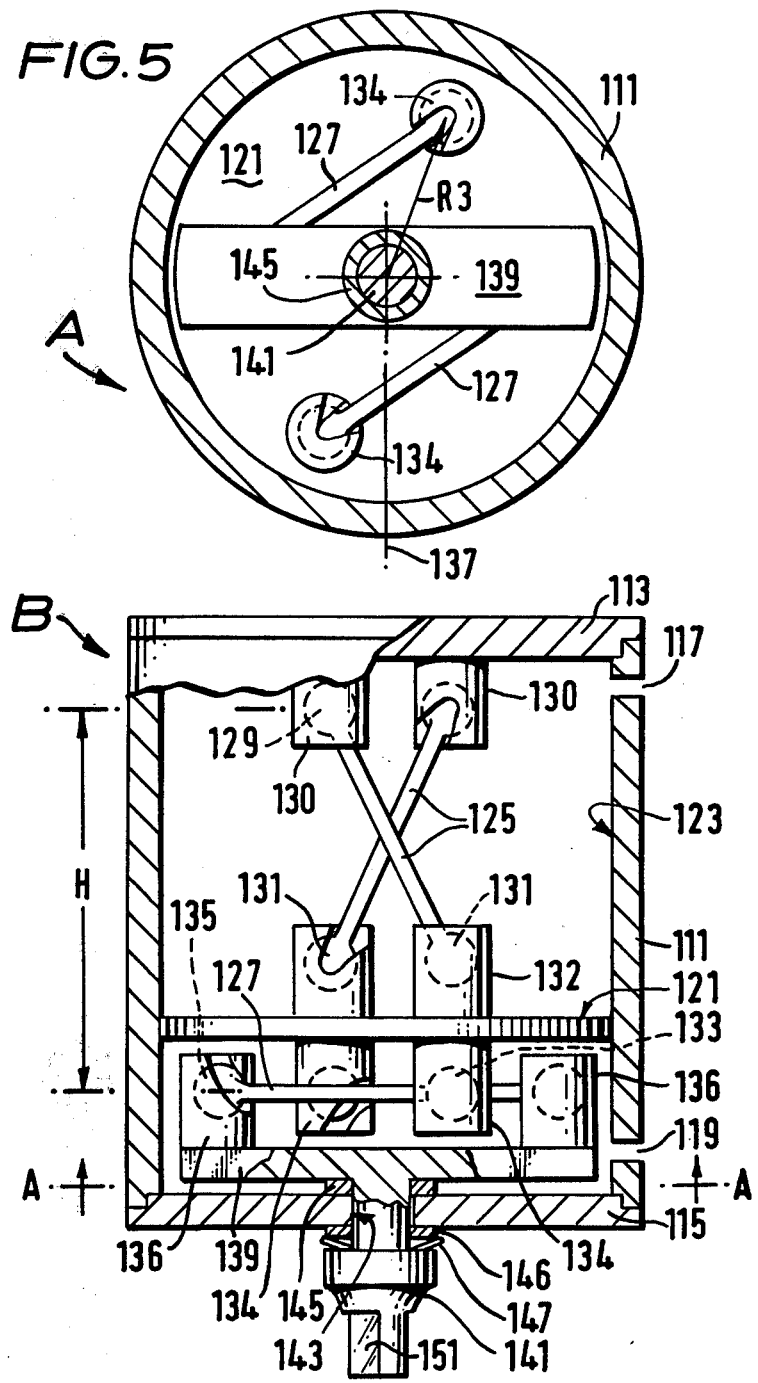
FIG. 5 illustrates a transverse section and an axial part-section of another actuator in accordance with the invention.

FIG. 5 illustrates a pressure fluid operated rotary actuator particularly suitable for plug valves, an axial part-section of the actuator being shown at B and a transverse section through the line AA being shown at A. The actuator comprises a cylinder 111 closed at its ends with cylinder heads 113 and 115 and former near its ends with fluid ports 117, 119. A piston 121 sealingly engaged around its periphery with the bore 123 of the cylinder 111 is axially movable in the cylinder under the action of pressure fluid supplied to either of the ports 117, 119, and is supported by first and second pairs of connecting elements 125, 127.

The first pair of connecting elements 125 comprises a pair of rigid rods of equal length L1 each extending between and universally pivoted by means of ball joints at its first and second ends 129, 131 with turrets 130, 132 projecting from the cylinder head 113 and the piston 121 respectively. The first ends 129 are equally spaced from the axis 137 of the cylinder 111 at a first radius R1, and the second ends 131 are equally spaced from the axis 137 at a second radius R2. The second pair of connecting elements 127 comprises a pair of rigid rods of equal length L2 each extending between and universally pivoted by means of ball joints at its first and second ends 133, 135 with turrets 134, 136 projecting from the piston 121 and a rotary member 139 respectively. The first ends 133 are equally spaced from the axis 137 at a third radius R3 and the second ends 135 are equally spaced from the axis 137 at a fourth radius R4. The configuration is anticircumfluent i.e. the tangential components of the directions in which the first pair of connecting elements 125 extend away from the cylinder head 113 towards the piston 121 are directed in one angular sense about the axis 137, and the tangential components of the directions in which the second pair of connecting elements 127 extend away from the piston 121 towards the rotary member 139 are directed in the other angular sense about the axis 137. In the particular embodiment illustrated, the first, second, third and fourth radii are equal, but this need not necessarily be the case.

It should be noted that throughout this specification the "ends" of the connecting elements 125, 127 are taken to be the pivot center of the universal pivots. Thus, the "length" L of a connecting element is the distance between the center of the balls of the ball joints at the respective ends of the element.

The rotary member 139 comprises a diametrically extending arm fast to the end of an output shaft 141 which is coaxial with the cylinder 111 and rotatably supported in an orifice 143 formed in the cylinder head 115. The shaft 141 is axially secured by means of a first thrust washer 145 disposed between the lower (as seen in the drawing) surface of the arm 139 and the inner surface of the cylinder head 115, a second thrust washer 146 disposed adjacent the outer surface of the cylinder head 115, and a spring washer 147 compressed between the thrust washer 146 and the radial face of a shoulder 149 formed on the shaft 141. The outer end of the output shaft 141 is formed with a key 151 for engagement with a complementary socket of the input shaft of a valve or the like.

In use, the piston 121 can be driven upwardly or downwardly (as seen in the drawing) as required by supply of pressure fluid to port 119 or 117 respectively. That linear motion is converted into rotatory motion of the arm 139 and output shaft 141 through pivotal action of the connecting elements 125 and 127 in a manner similar to that described above with reference to FIG. 4.

Advantageously, projections (not shown) can be provided on the inner surface of the cylinder head 115 for abutment by the turrets 134 when the piston moves to the lower (as shown) position. This arrangement provides an endstop for the piston 121, and thus avoids striking of the piston against the turrets 136 and consequential jarring of the output shaft 141.

An advantage of devices of the type described is that, as noted above, by modification of the relative dimensions of the components of the device, the form of the torque characteristic (that is to say, the relationship between the output torque produced by a given axial force on the piston and the angular displacement of the output shaft) can be modified. In particular, by suitably selecting the radii R1, R2, R3 and R4, the lengths L1 and L2 and the axial separation H of the axially fixed ends 129 and 135 of the connecting elements 125 and 127, the torque characteristic can be arranged so that the output torque is substantially flat or increases towards the ends of the angular range of rotation of the output shaft. This is of substantial advantage is pressure fluid operated actuators for plug valves: the "break-out torque" and "closing torque" required to rotate the plug of a rotary plug valve near the ends of its travel are generally much higher than the torque required to turn the plug at intermediate positions. Moreover, in the case of fluid operated actuators having spring return action in which a return spring is arranged to act axially on the piston 121 (either directly or, for example, by coupling to a piston rod), the torque characteristic can be so tailored that, as the piston is moved under the action of the spring (and the axial force exerted by the spring necessarily decreases as the spring relaxes) the output torque provided by the device remains substantially constant or even increases. In other words, the device can be arranged so that the decrease in the force exerted by the spring as the spring relaxes is compensated by the rise in the torque characteristic as the device approaches the end of its operating range.

Figure 6:
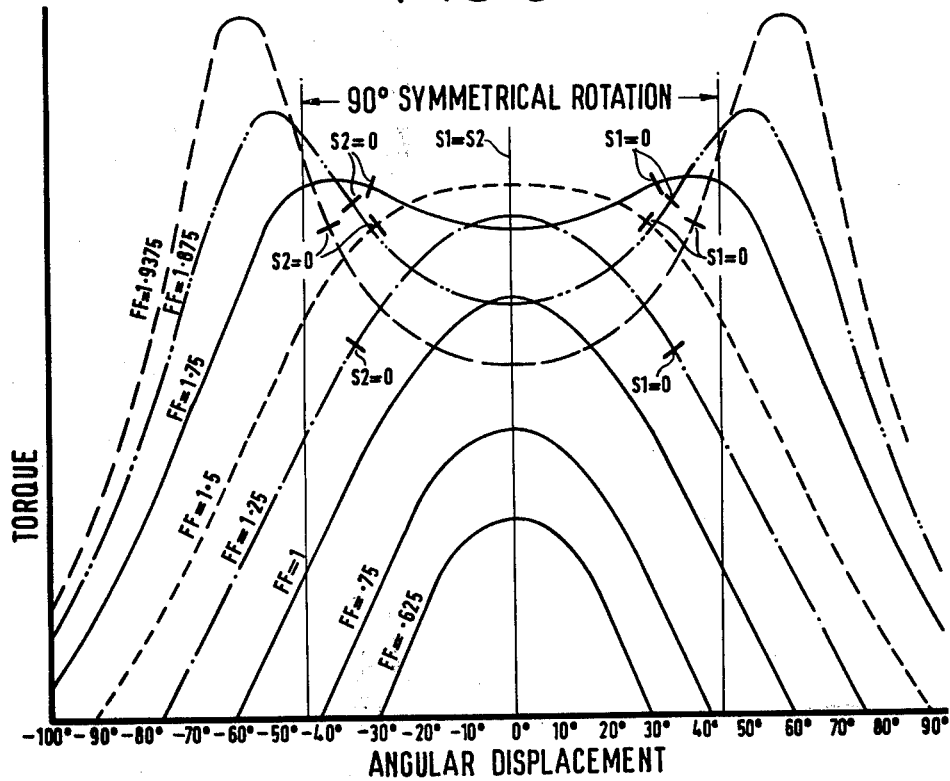
FIG. 6 shows graphs representing the torque outputs of actuators similar to that of FIG. 5 but with different relative dimensions.

By way of illustration, FIG. 6 shows graphs of the theoretical variation of output torque with angular displacement of the output shaft for actuators of the construction illustrated in FIG. 5 having different connecting element lengths and in each of which R1=R2=R3=R4=H=1 and FF1=FF2=FF. The values of FF are shown adjacent the respective graphs. As can be seen from the Figure, for values of FF less than about 1.5, the torque output is at a maximum at the center of travel and falls away steeply towards the ends of travel (for a plug valve the angular displacement required to turn the plug from the open to the closed positions, or vice versa, is normally 90 degrees, so the normal range of travel of the actuator illustrated is between +45 degrees and −45 degrees.) For larger values of FF, however, a dip occurs in the torque characteristic at the center of travel, the dip becoming increasingly pronounced as the value of FF approaches 2.0, so that the torque output increases towards the ends of travel.

The points on the graphs indicated at S1=0 and S2=0 correspond to those angular positions of the output shaft at which the connecting elements 125 and 127 respectively lie flat in a transverse plane orthogonal to the axis 137. The device of FIG. 5 can be arranged to enable the piston to travel axially outwardly beyond the positions in which the connecting elements lie flat by increasing the heights of the turrets 130, 132, 134, 136, thereby spacing the pivot centers at the ends of the connecting elements further from the associated supporting members 113, 121 and 139.

A difficulty associated with use of the rotary actuator described for operating devices such as, for example, plug valves, is that of isolating the drive shaft of the driven device from axial thrust which might otherwise be transmitted thereto by the output shaft of the actuator. Application of axial thrust to the drive shaft of a plug valve during rotation of that shaft can cause severe damage of the gland seal or other bearing means for the shaft.

During operation of the actuator described above, the entire axial thrust on the piston 121 is reacted through the connecting elements 125 and 127. The distribution of that reaction thrust between the elements 125 and the elements 127 depends upon the relative angles of inclination of those elements to the axis 137. Accordingly, the arm 139 and thus the shaft 141 are subjected to an axial thrust by the connecting elements 125 which varies with the varying angles of inclination of the connecting elements as the actuator is operated.

For example, when the piston 121 is at the lower (as seen in the drawing) end of its stroke adjacent the arm 139, and the pressure fluid is supplied to the lower (as seen in the drawing) chamber to force the piston 121 upwardly, the outwardly directed force to which the shaft is subjected by the pressure of the fluid acting over the cross-sectional area of the portion of the shaft passing through the orifice 143 could exceed the axial component of the force applied to the output shaft by the connecting elements. Accordingly, there is then a net outward thrust on the output shaft. However, as the piston moves upwardly (as seen in the drawing), the lower connecting elements 127 become inclined increasingly more shallowly and the upper connecting elements 125 increasingly more steeply relative to the axis, so that the axial thrust on the piston is reacted increasingly against the output shaft. At some intermediate point during this motion, therefore, the net axial thrust on the output shaft reverses in sense, and as the piston reaches the end of its travel there is a large, inwardly directed net thrust on the output shaft. As the piston is driven in the opposite direction, of course, a large outwardly directed axial thrust is applied to the output shaft at the beginning of travel, and this progressively decreases as the piston moves back towards the lower (as seen in the drawing) end of the cylinder 111.

It will be appreciated that in all cases the axial thrust applied to the output element for any given position of the piston is proportional to the reaction torque presented by the driven device.

A common arrangement for coupling the output shaft of an actuator with the input shaft of a rotary device is to provide a square key on one shaft with a complementary socket on the other. With this arrangement, the shafts are effectively locked together by friction as soon as torque is applied through the coupling, the strength of the "friction lock" being generally proportional to the torque applied. In effect, therefore, the shafts are rigidly coupled.

Moreover, provision of thrust washers alone to bear the axial thrust reaction on the output shaft cannot of itself entirely eliminate axial movement of the shaft, and particularly after wear has occured with use of the device such axial movement can be sufficient for the axial thrust to be transmitted to the shaft of the plug valve.

To meet this problem, means are provided to axially bias the output shaft in one sense with a force which is substantially equal to or greater than the axial component of reaction thrust exerted on the shaft in the opposite sense during normal operation of the actuator. In the embodiment of FIG. 5, that means comprises the spring washer 147. The effect of the bias force applied by the spring washer 147 is to maintain the lower (as seen in the drawing) surface of the arm 139 in positive engagement with the thrust washer 145 which in turn engages the inner surface of the cylinder head 115. The shaft is thus positively located in the axial direction, and no axial movement of the shaft can occur relative to the cylinder head 115 during operation of the actuator.

Figure 7:
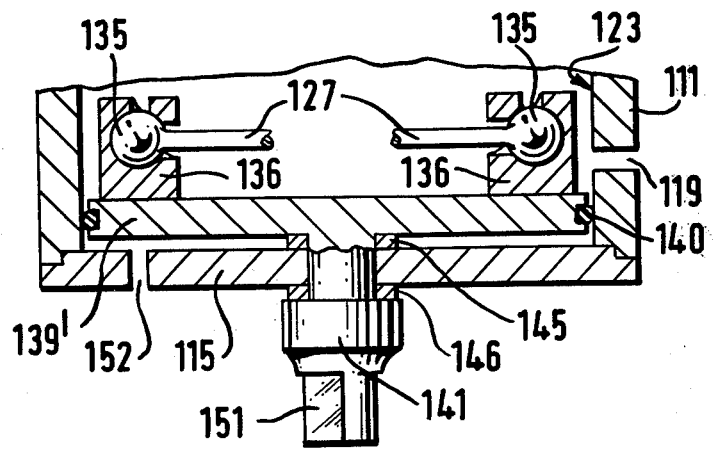
FIG. 7 illustrates a transverse section through part of a modified form of the actuator of FIG. 5.

FIG. 7 illustrates an axial section through an actuator essentially identical to that of FIG. 5 except that the arm 139 is replaced by a disc 139', and the spring washer 147 is omitted. The disc 139' is provided around its periphery with an 'O'-ring 140 to form a seal with the bore 123, and the space between the disc and cylinder head 115 is vented by a port 152 formed in the cylinder head. Accordingly, the pressure of pressure fluid supplied through the lower port 119 to drive the piston upwardly acts on the disc 139' and, since the area of that disc is equal to that of the piston, exerts an outwardly directed axial force thereon at least equal to the reaction thrust exerted thereon by the piston acting through the connecting elements 127. In the embodiment of FIG. 7, therefore, the disc 139' provides the means for axially biasing the output shaft.

We claim:
1. A device for interconverting linear motion and rotatory motion, said device comprising:
   (a) first, second and third elements mounted to permit linear motion of said second element relative to said first and third elements and rotatory motion of said second and third elements relative to each other and to said first element about a common axis parallel with the direction of said linear motion;

(b) a first plurality of elongate connecting elements each having a first length and extending between and universally pivoted at its first and second ends with said first and second elements respectively; and (c) a second plurality of elongate connecting elements each having a second length and extending between and universally pivoted at its first and second ends with said second and third elements respectively, wherein said first and second ends of said each connecting element of said first plurality are spaced from said axis at respective first and second radii, said first and second ends of said each connecting element of said second plurality are spaced from said axis at respective third and fourth radii, the tangential components of the directions in which the connecting elements of said first plurality extend away from said first element towards said second element are directed in one angular sense about said axis, the tangential components of the directions in which the connecting elements of said second plurality extend away from said second element towards said third element are directed in the other angular sense about said axis, and said linear and rotatory motions are interconvertable through pivotal action of said connecting elements.

2. A device as claimed in claim wherein at least two of said first, second, third and fourth radii are substantially equal.

3. A device as claimed in claim 1 wherein said first and second lengths are substantially equal.

4. A device as claimed in claim 1 wherein said connecting elements are resiliently flexible.

5. A device as claimed in claim 1 wherein said connecting elements are rigid.

6. A rotary actuator comprising a device as claimed in claim 1 wherein said first element is fixed, said third element is retained in a fixed axial position relative to said first element, and said second element is arranged to be driven axially relative to said first and third elements whereby to drive said third element rotatably relative to said first element.

7. An actuator as claimed in claim 6 wherein the relative dimensions of said first, second, third and fourth radii, said first and second lengths and the axial separation of said first and third elements are such that the torque developed between said first and third elements is response to a given axial force applied to said second element is substantially constant or passes through a minimum as said second element is moved axially between said first and third elements.

8. An actuator as claimed in claim 7 wherein said first, second, third and fourth radii are substantially equal, said first and second lengths are substantially equal, and said first and third elements are axially spaced with a separation which is of the same order of magnitude as said radii.

9. An actuator as claimed in claim 8 wherein the ratio of said substantially equal lengths and said substantially equal radii is of the order of 1.8.

10. An actuator as claimed in claim 6 comprising a cylindrical chamber, wherein said second element forms a piston axially slideable and rotatable in said chamber whereby said second element can be driven axially relative to said first and third elements by the supply of pressure fluid to said chamber.

11. An actuator as claimed in claim 6 for a rotary device which is actuable in response to an applied torque within a given operating range, said actuator comprising an axially fixed thrust bearing surface for engagement by a radial surface of said third element to provide positive axial location thereof, and bias means arranged so that, at least during operation of the actuator to supply a torque within said operating range, said third element is resiliently biased, in the axial direction tending to engage said radial surface with said bearing surface, with a force which is substantially equal to or greater than the axial component of force exerted on said third element by said connecting elements.

12. An actuator as claimed in claim 11 wherein said bias means comprises spring washer means compressed between an annular shoulder formed on said third element and a fixed annular thrust surface, said spring washer means being stressed to urge said third element in said axial direction with a force which is at least substantially equal to the maximum axial component of force exerted on said third element by said connecting elements during operation of the actuator to supply a torque within said operating range.

13. An actuator as claimed in claim 10 for a rotary device actuable in response to an applied torque which is within a given operating range, said actuator comprising an axially fixed thrust bearing surface for engagement by a radial surface of said third element to provide positive axial location thereof, and bias means arranged so that, at least during operation of the actuator to supply a torque within said operating range, said third element is resiliently biased in the axial direction tending to engage said radial surface with said bearing surface, wherein said bias means comprises a disc connected with or forming part of said third element and sealingly and slidingly engaged around its periphery with the bore of said cylindrical chamber so that said disc and piston define respective ends of said chamber, whereby in use of said actuator, the pressure exerted on said disc by pressure fluid supplied to said chamber urges said third element in the said axial direction with a force substantially equal to or greater than the axial component of force exerted on said third element by said connecting elements.

14. An actuator as claimed in claim 6 comprising spring means acting between said first and second elements to urge said second element axially relative to said first element whereby to provide spring return action of said actuator.

15. A rotary actuator for a rotary device actuable in response to an applied torque which is within a given operating range, said actuator comprising:

(a) an output shaft;
(b) a linearly movable element mounted for axial displacement relative to said shaft;
(c) connecting means including at least one eccentrically disposed connecting element extending between and pivotally connected at its ends with said linearly movable element and output shaft respectively to convert axial motion of said linearly movable element into rotatory motion of said shaft;
(d) a thrust bearing surface for engagement by a radial surface of said shaft to provide positive axial location thereof; and
(e) bias means arranged so that, at least during operation of the actuator to supply a torque within said operating range, said shaft is resiliently biased, in the axial direction tending to engage said radial surface with said bearing surface, with a force which is substantially equal to or greater than the axial component of force exerted on said shaft by said connecting means.

16. An actuator as claimed in claim 15 wherein said bias means comprises spring washer means compressed between an annular shoulder formed on said shaft and a fixed annular thrust surface, said spring washer means being stressed to urge said shaft in said axial direction with a force which is at least substantially equal to the maximum axial component of force exerted on said shaft by said connecting means during operation of the actuator to supply a torque within said operating range.

17. An actuator as claimed in claim 15 comprising a cylindrical bore wherein said linearly movable element is formed by a piston slideable in said cylindrical bore for axial displacement therein in response to supplied pressure fluid, and said bias means comprises a disc connected with said shaft and sealingly and slidingly engaged around its periphery with said cylindrical bore so that said disc and piston define respective ends of the chamber to which pressure fluid is supplied in use of the actuator to urge said piston in the axial direction opposed in sense to the said axial direction, whereby in use of the actuator, the pressure exerted on said disc by pressure fluid supplied to said chamber urges said shaft in the said axial direction with a force substantially equal to or greater than the axial component of force exerted on said shaft by said connecting means.

18. A rotary actuator comprising first, second and third elements mounted to permit linear motion of said second element relative to said first and third elements and rotatory motion of said second and third elements relative to each other and to said first element about a common axis parallel with the direction of said linear motion; a first plurality of elongate connecting elements each having a first length and extending between and universally pivoted at its first and second ends with said first and second elements respectively; and a second plurality of elongate connecting elements each having a second length and extending between and universally pivoted at its first and second ends with said second and third elements respectively; the tangential components of the directions in which the connecting elements of said first plurality extend away from said first element towards said second element being directed in one angular sense about said axis and the tangential components of the directions in which the connecting elements of said second plurality extend away from said second element towards said third element being directed in the other angular sense about said axis whereby the configuration of said elements is anticircumfluent, said second element lying between said first and third elements, said first element being fixed, said third element being retained in a fixed axial position relative to said first element, and said second element being arranged to be driven axially relative to said first and third elements whereby to drive said third element rotatably relative to said first element.

19. A device for interconverting linear motion and rotary motion, said device comprising first and third elements separated from one another along an axis, a second element located upon said axis between said first and third elements, a first plurality of elongate connecting elements each extending between and universally pivoted at its first and second ends with said first and second elements respectively, and a second plurality of elongate connecting elements extending between and universally pivoted at its first and second ends with said second and third elements respectively, wherein said first element is fixed, said third element is retained in a fixed axial position relative to said first element and at a distance therefrom less than the combined lengths of an element of said first plurality and an element of said second plurality, said second element being free to move both axially and rotationally between said first and third elements, the elements of said first plurality extending away from said first element towards said second element in directions having tangential components directed in one sense around the axis of the device, and the elements of said second plurality extending away from said second element towards said third element in directions having tangential components directed in the reverse sense about said axis, the arrangement being such that an axial drive applied to said second element to drive it axially between said first and third elements will impart a rotary motion to said third element and a rotary drive applied to said third element will impart an axial motion to said second element.

20. A rotary actuator comprising a device as claimed in claim 19, in which said second element is arranged to be driven axially between said first and third elements between a first position in which the connecting elements of said first plurality lie substantially in a plane radial to the axis of the device and the connecting elements of said second plurality lie at an angle askew to said axis and a second position in which the connecting elements of said first plurality lie askew to said axis while the connecting elements of said second plurality lie substantially in a radial plane.

21. A rotary actuator for a rotary device actuable in response to an applied torque which is within a given operating range, said actuator comprising an output element connected to an output shaft; a linearly movable element mounted for axial displacement relative to said output element; connecting means including a first plurality of elongate connecting elements each extending and universally pivoted at its ends with said linearly movable element and said output element and a second plurality of elongate connecting elements each extending and universally pivoted at its ends with said linearly movable element and a fixed bearing surface, wherein the tangential components of the directions in which the connecting elements of said first plurality extend away from said output element towards said linearly movable element are directed in one angular sense about the axis of said output shaft and the tangential components of the directions in which the connecting elements of said second plurality extend away from said linearly movable element towards said fixed bearing surface are directed in the other angular sense about the axis of said output shaft, whereby axial motion of said linearly movable element is converted into rotary motion of said shaft; a thrust bearing surface for engagement by a radial surface of said shaft to provide positive axial location thereof; and bias means arranged so that, at least during operation of the actuator to supply a torque within said operating range, said shaft is resiliently biased, in the axial direction tending to engage said radial surface with said bearing surface, with a force which is substantially equal to or greater than the axial component of force exerted on said shaft by said connecting means.

* * * * *